US006969185B1

(12) United States Patent
Adair

(10) Patent No.: US 6,969,185 B1
(45) Date of Patent: Nov. 29, 2005

(54) SAFETY BARRIER WITH ILLUMINATING COMPONENTS

(76) Inventor: Darryl Adair, 90 W. Main St., Suite 4, Morgan Hill, CA (US) 95037-4532

( * ) Notice: Subject to any disclaimer, the term of this patent is extended or adjusted under 35 U.S.C. 154(b) by 106 days.

(21) Appl. No.: 10/402,746

(22) Filed: Mar. 28, 2003

(51) Int. Cl.[7] ............... B60Q 1/52; B60Q 7/00; E01F 13/00
(52) U.S. Cl. ............ 362/542; 362/252; 362/486; 362/559; 340/473; 340/908.1; 49/9
(58) Field of Search ............... 362/554, 556, 362/559, 565, 570, 486, 540, 542, 84, 249–252, 362/555, 576, 496, 511; 40/547, 457; 340/907, 340/908, 908.1, 473; 49/9, 34; 404/6

(56) References Cited

U.S. PATENT DOCUMENTS

| 2,675,197 | A | * | 4/1954 | Hospers ................... 49/9 |
| 4,574,269 | A | * | 3/1986 | Miller .................... 362/540 |
| 5,624,203 | A | * | 4/1997 | Jackson et al. ............ 404/6 |
| 5,667,295 | A | * | 9/1997 | Tsui ..................... 362/252 |
| 5,818,998 | A | * | 10/1998 | Harris et al. ............ 362/554 |
| 5,882,742 | A | * | 3/1999 | Lin ..................... 362/252 |
| 6,092,318 | A | * | 7/2000 | Arie et al. ............... 40/547 |
| 6,142,701 | A | * | 11/2000 | Falcon ................... 404/6 |
| 6,490,402 | B1 | * | 12/2002 | Ota ..................... 362/554 |
| 6,628,885 | B1 | * | 9/2003 | Wilkie et al. ............ 385/147 |
| 2001/0024364 | A1 | * | 9/2001 | Hurwitz .................. 362/84 |
| 2004/0012979 | A1 | * | 1/2004 | Squicciarini ............. 362/555 |

* cited by examiner

Primary Examiner—Alan Cariaso
(74) Attorney, Agent, or Firm—The Kline Law Firm

(57) ABSTRACT

A safety net that includes at least one illuminating element. The safety net is intended to be stored in a rolled-up fashion (similar to a roll-up window shade) in the trunk of a vehicle. When illuminated, the safety net provides a completely new and unique means of alerting oncoming traffic to a road hazard or other situation requiring traffic control. The safety net provides a warning means that will not be knocked over by the wind, as wind blows freely through the voids of the net. In addition, the safety net screens the scene from the view of those in oncoming traffic. The device may include a solid state controller that provides a variety of patterns or symbols to further enhance the visual safety features of the device. This can be accomplished by placing fiber optic strands in the net voids, or within the side illuminating fiber optic conduit itself. The device may also include metal cables to form a physical barrier.

8 Claims, 15 Drawing Sheets

SAFETY BARRIER WITH ILLUMINATING COMPONENTS

BACKGROUND OF THE INVENTION

1. Field of the Invention

The present invention relates generally to safety equipment, and more particularly is a traffic safety barrier with enhanced visual cues as well as physical restraining means.

2. Description of the Prior Art

When there are interruptions to the flow of traffic on streets and highways, such as repairs or vehicle breakdowns or collisions, traffic safety devices are used to warn approaching vehicles of the obstacles. Flashing lights, reflectors, and flares are among the warning devices commonly used in these situations, and are all well known in the art. These devices alert drivers to an existing hazard, but by drawing attention to the problem, slow traffic and can actually create potentially more serious hazards. Flares in particular can exacerbate a problem if gas fumes, oil, chemicals, or other combustible materials are present.

Fiber optic conduit is well known in the art, and has been employed on a limited basis as an alternative/enhancement to flares and/or flashing lights. An example of the use of this combination is U.S. Pat. No. 6,450,677 issued on Sep. 17, 2002, to Knauer et al. Flexible side-illuminating fiber optic conduit is also known in the art, and has been employed chiefly for signs, pools, and landscaping applications. The use of fiber optic conduit for additional illumination is illustrated in U.S. Pat. No. 5,987,199 issued on Nov. 16, 1999, to Zarian et al.

Another means of creating a flexible light string is disclosed in U.S. Pat. No. 6,371,637 issued on Apr. 16, 2002, to Atchinson, et al. This reference teaches a flexible PCB substrate with a plurality of LED's attached thereto.

It is an object of the present invention to provide a safety and warning device that not only alerts passersby to a hazard, but also physically restrains entry into the hazardous area.

It is another object of the present invention to provide a device that can be easily transported in a car.

It is still another object of the present invention to provide a device that inhibits viewing of an accident site or other problematic area.

SUMMARY OF THE INVENTION

The present invention is a safety net that includes flexible side-illuminating fiber optic conduit. The safety net is intended to be stored in a rolled-up fashion (similar to a roll-up window shade) in the trunk of a vehicle. When the user is ready to deploy the safety net, the rolled-up net is removed from the trunk and clamped to the bumper and/or latched to the rear of the vehicle. The user then unrolls the safety net across the area desired to be screened off. The free end of the net is connected to either a free-standing post, a light or sign post, a center divider or wall, another vehicle, or another safety net.

When illuminated, the safety net provides a completely new and unique means of alerting oncoming traffic to a road hazard or other situation requiring traffic control. The safety net provides a warning means that will not be knocked over by the wind, as wind blows freely through the voids of the net. In addition, the safety net screens the scene from the view of those in oncoming traffic. Drivers therefore have little reason to slow the flow of traffic by rubber-necking. After dark, the safety net becomes even more visible, thereby providing additional safety for the oncoming traffic. Moreover, the illumination of the safety net provides additional lighting for the area screened by the net, which can be helpful to an emergency crew.

The present invention may include a solid state controller to provide a variety of patterns or symbols to further enhance the visual safety features of the device. This can be accomplished by placing fiber optic strands in the net voids, or within the side illuminating fiber optic conduit itself. Utilizing the ends of the added fiber optic strands, a brighter and/or colored light can be channeled with pinpoint accuracy to create symbols such as red triangles, flashing orange arrowheads, warning text, or any other graphic desired by the user.

The present invention may also be fitted with one or more metal cables for additional impact resistance. This feature adds another level of safety. If a moving vehicle does come into contact with the net, that vehicle can be slowed or stopped (provided that one end is not attached to a free-standing post).

The safety net need not be used with posts or cables to maintain utility. When the safety net is used as an emergency rescue marker in the wilderness, the safety net can be draped across the ground or hung between trees like a hammock. When electrical current is not available, light can be channeled into the safety net by a gas, propane, or battery operated lantern.

Expected uses of the safety net include but are not limited to road hazard alerts in the public sector, road hazard alerts in the private sector, construction or heavy equipment operation, dead end or bridge out warnings, directing parking lot traffic, banners or signs, rescue marker, and military applications.

An advantage of the present invention is that the device physically restrains entry into the designated area.

Another advantage of the present invention is that the safety net with fiber optic components is more visually noticeable.

A still further advantage of the present invention is that it is easily transportable in a typical car trunk.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
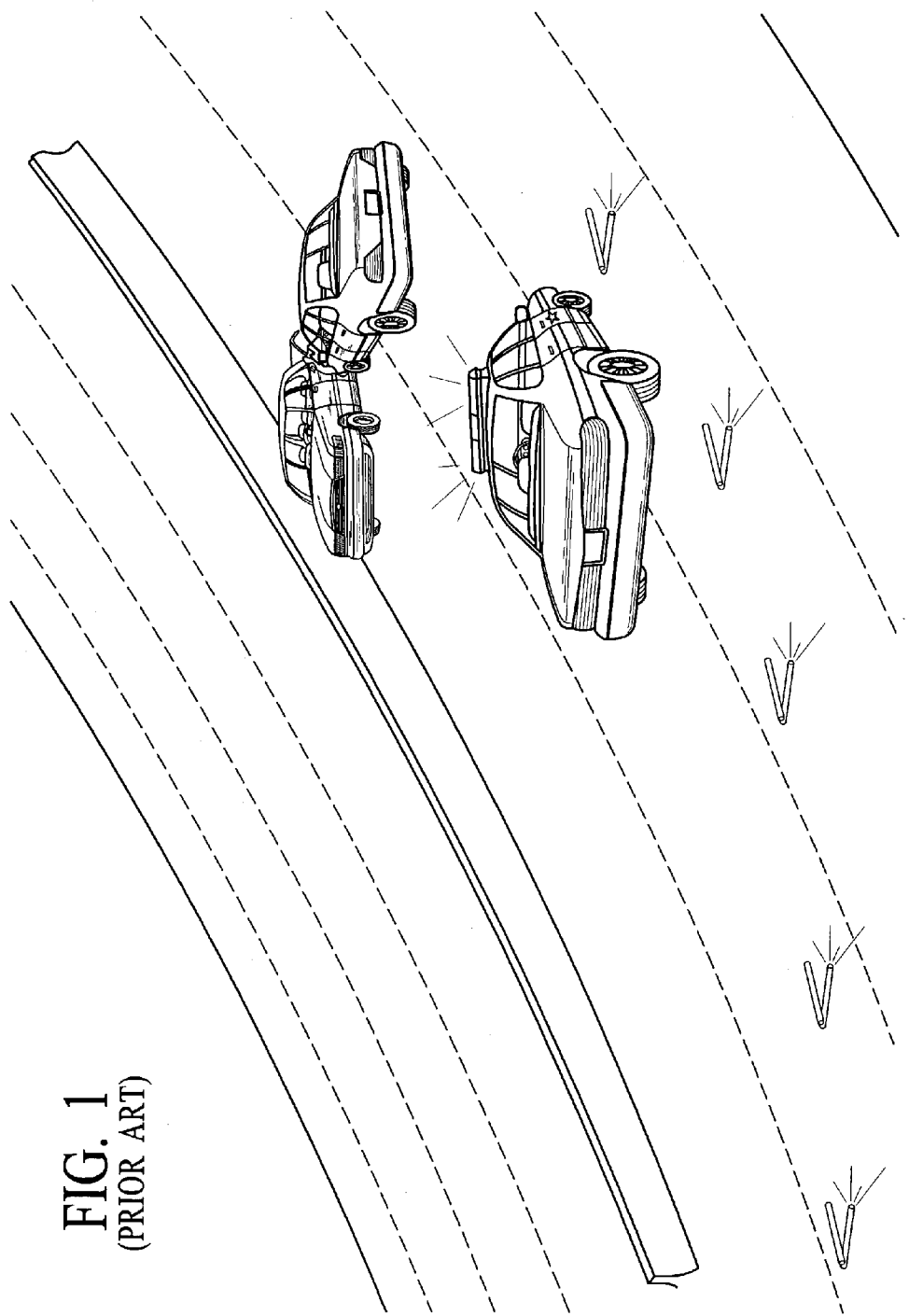
FIG. 1 is a depiction of prior art methods of safety barriers and warning methods.
Figure 2:
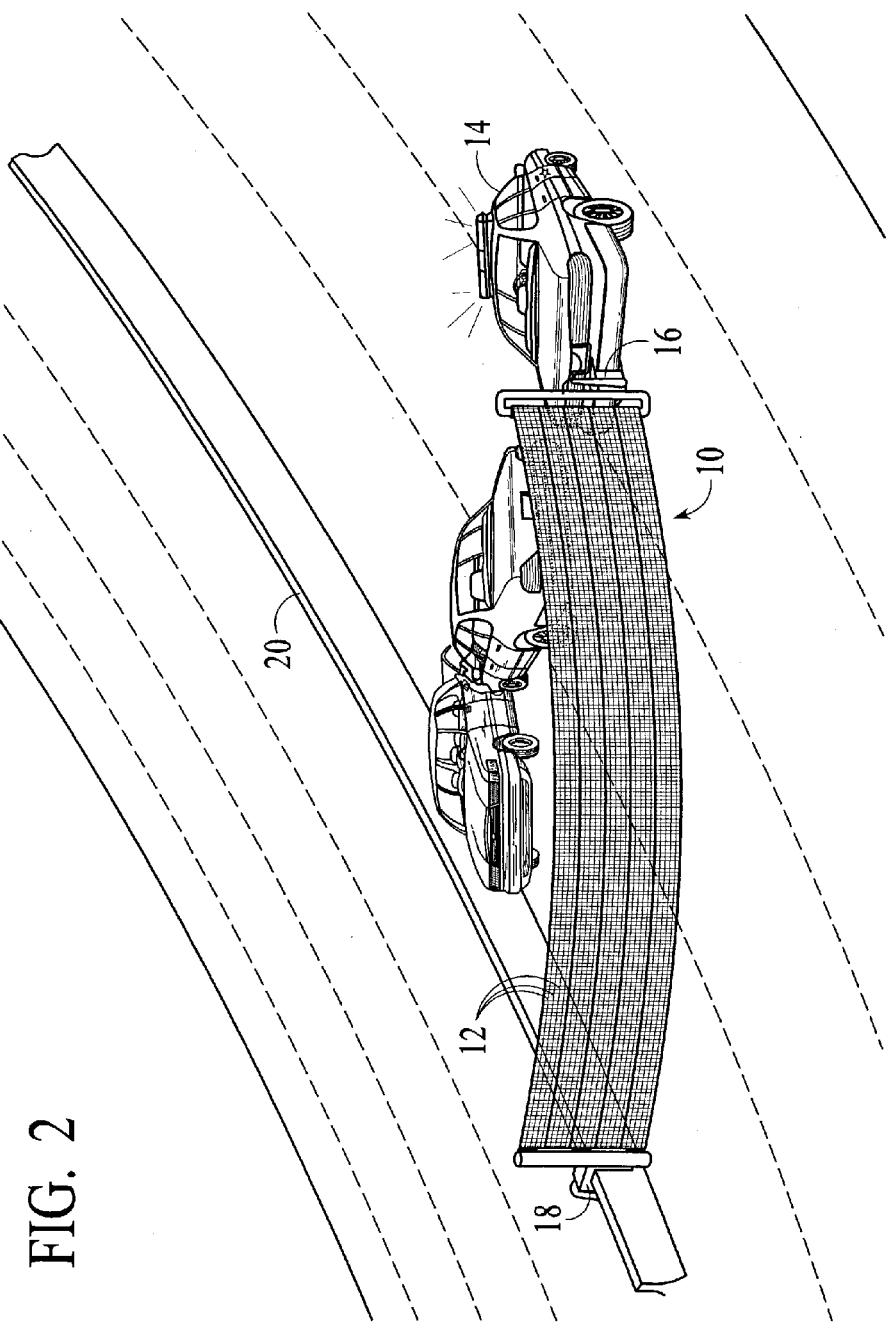
FIG. 2 shows the safety net of the present invention deployed between a median retainer and the rear bumper of a police car.

Referring first to FIG. 2, the present invention is a safety net 10 that includes at least one illuminating strand 12, typically contained in a flexible side-illuminating fiber optic conduit or flexible tube containing a plurality of LED illuminators. The optic strand 12 is woven into a fabric-like configuration, the flexibility of the conduit allowing the safety net 10 to be rolled-up (similar to a roll-up window shade) and stored in the trunk of an assisting vehicle 14. When the user is ready to deploy the safety net 10, the rolled-up net 10 is removed from the trunk and clamped to the bumper with a bumper mount 16. The net 10 can also be latched to the rear of the vehicle 14, such that closing the trunk lid locks the safety net 10 in place. The user then unrolls the safety net 10 across the area desired to be screened off. The free end of the net 10 is generally connected to either a free-standing post, a light or sign post, a center divider or wall, another vehicle, or another safety net. In FIG. 2, the free end of the safety net 10 is affixed to a barrier wall mount 18 that is supported on the center divider 20.

Figure 3:
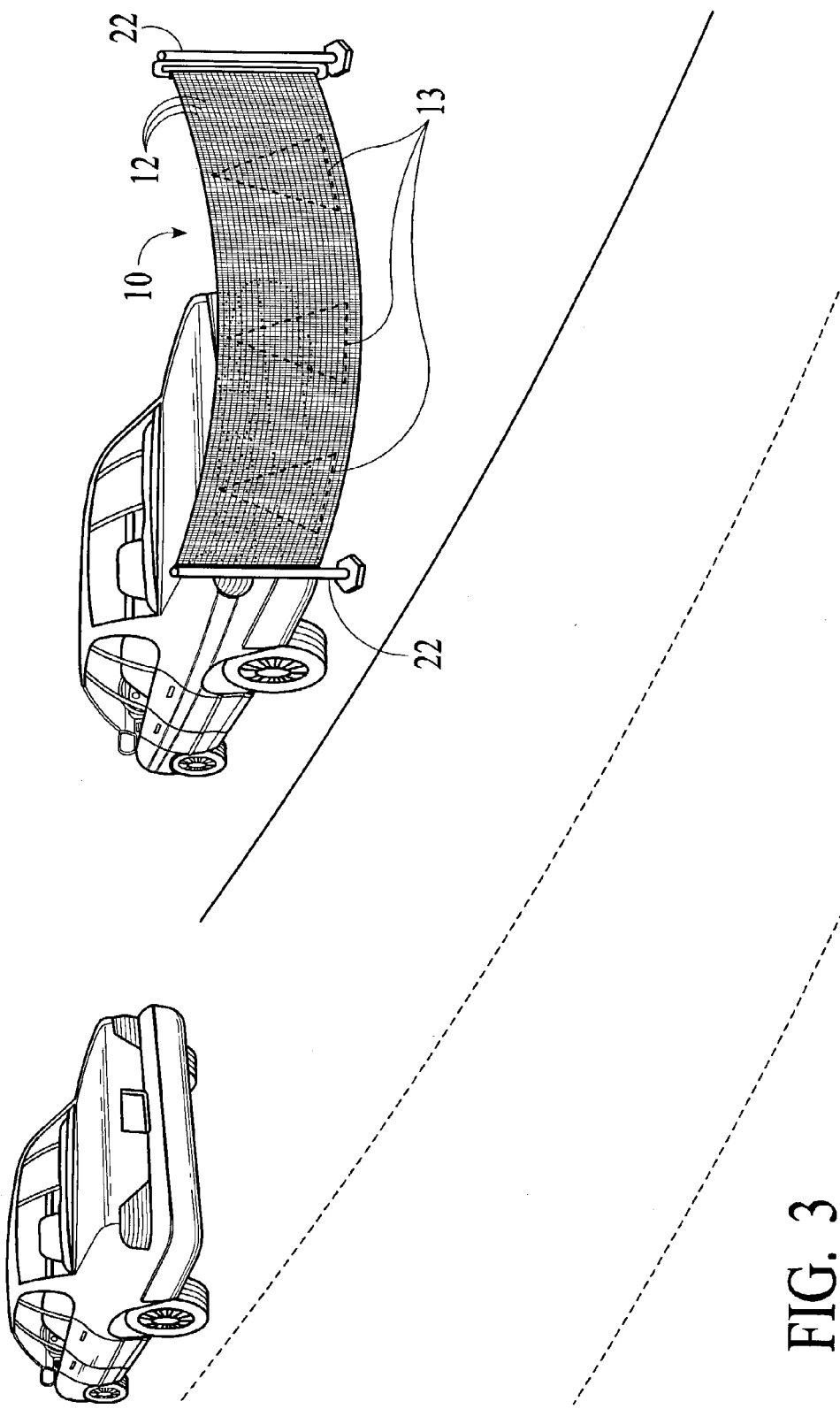
FIG. 3 shows the safety net mounted between two free-standing posts.

FIG. 3 illustrates a stand-alone version of the safety net 10. In this instance, both ends of the safety net 10 are supported by free-standing posts 22. This version of the safety net 10 is particularly useful for third party assistance, in that the net 10 can be deployed at the site without bringing another vehicle into the affected area. FIG. 3 also illustrates the use of the fiber optic strands 13 to form geometric shapes (in this case warning triangles) to more clearly warn passersby. The safety net 10 includes a solid state controller that can be used to provide a variety of patterns or symbols by selectively lighting areas of the fiber optic strands 13. The fiber optic strands 13 are deployed in voids of the material forming the safety net 10, or within the side illuminating fiber optic conduit 12 itself. Utilizing the ends of the added fiber optic strands, a brighter and/or colored light can be channeled with pinpoint accuracy to create symbols such as red triangles, flashing orange arrowheads, warning text, or any other graphic desired by the user.

Figure 4:
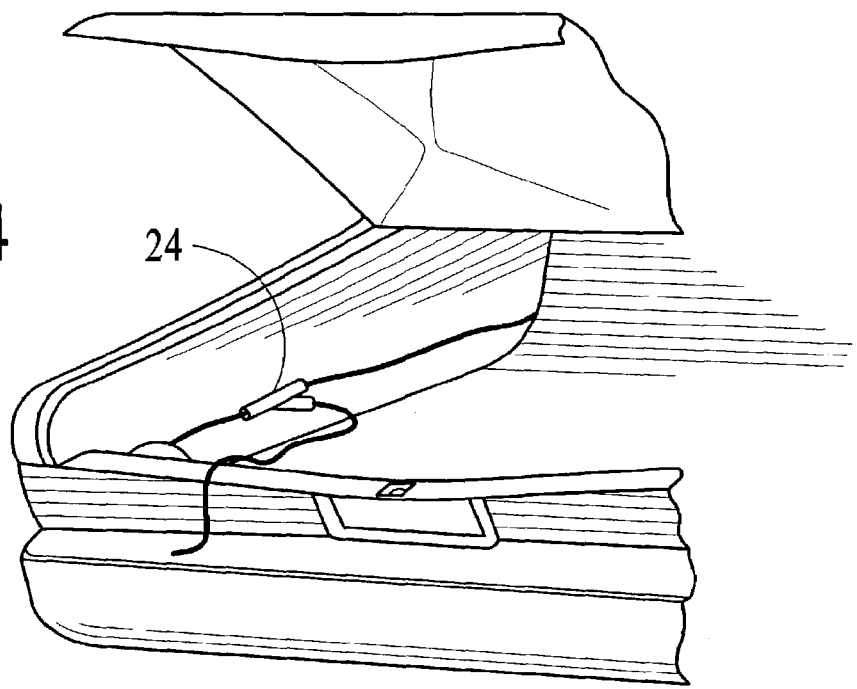
FIG. 4 shows a power supply using a standard automotive tow hitch light connector.
Figure 5:
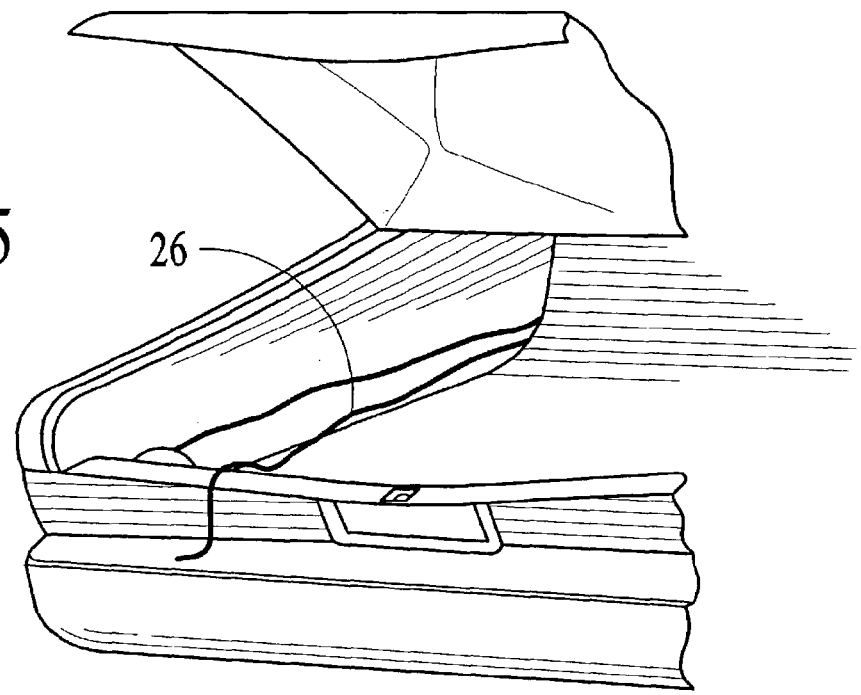
FIG. 5 shows a car with a power source dedicated to the safety net.
Figure 6:
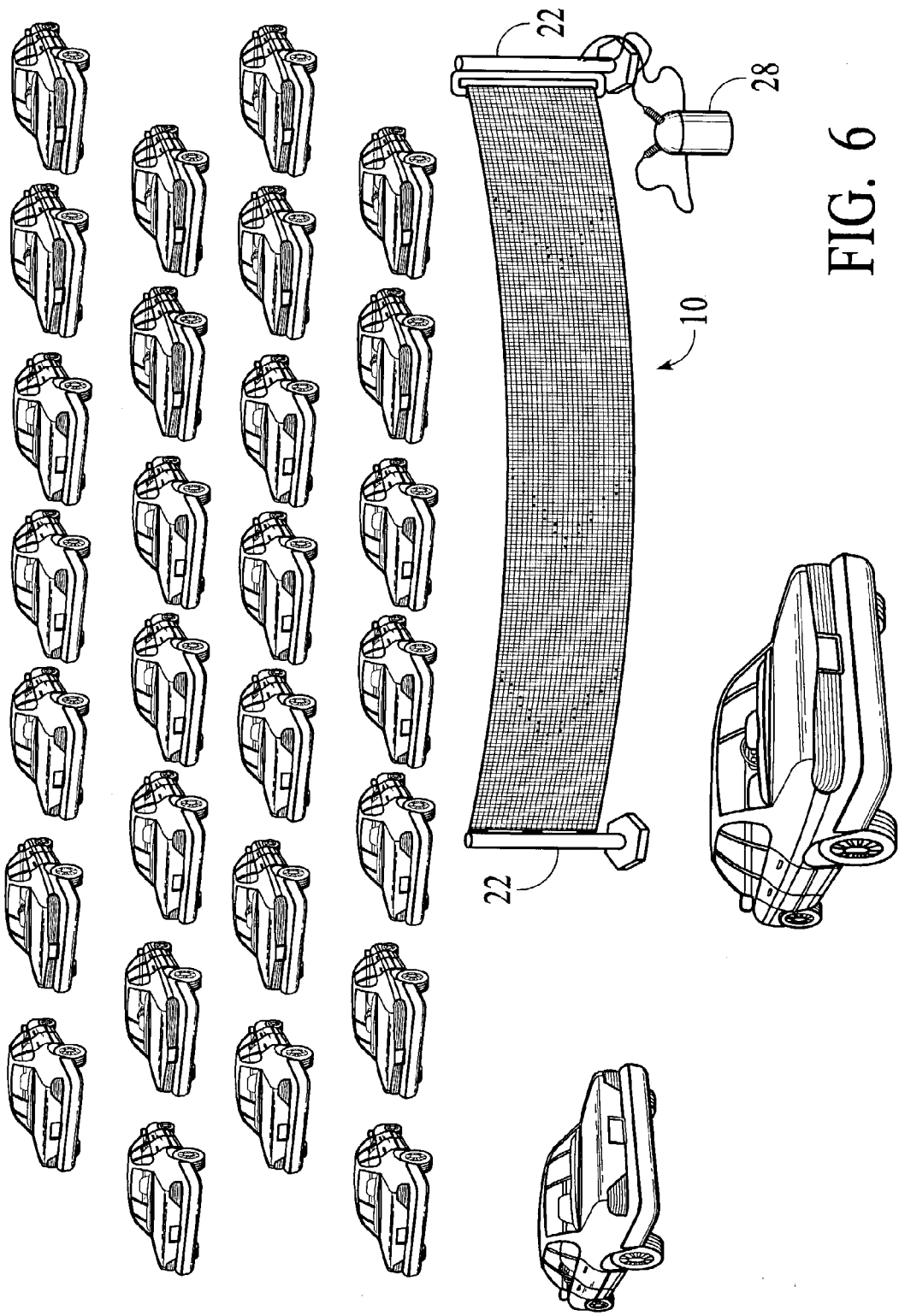
FIG. 6 illustrates the device using a portable power supply (batteries) to light the fiber optic components of the safety net used in a parking/traffic control situation.
Figure 7:
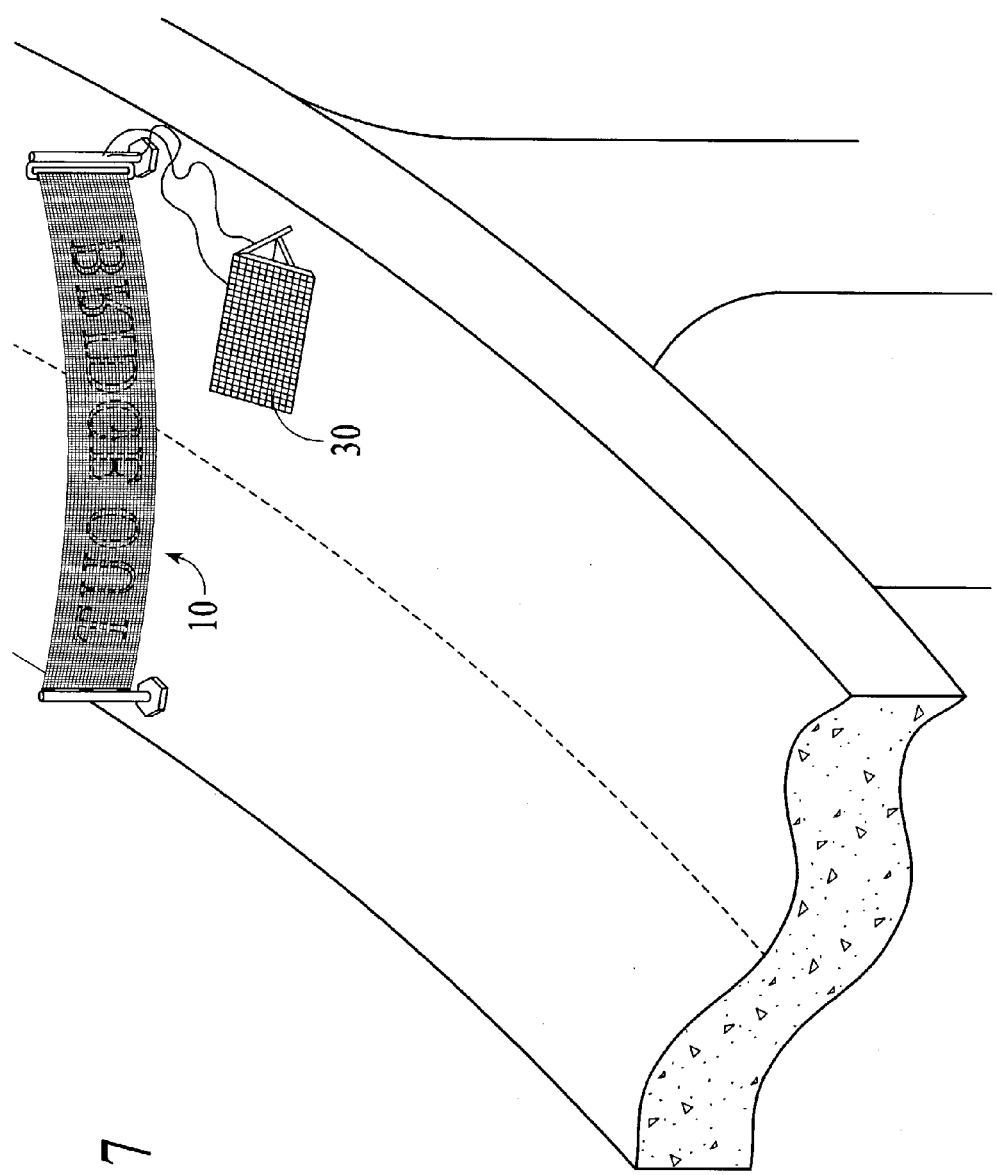
FIG. 7 shows the device using a portable power supply (solar cell) to light the fiber optic components of a hazard warning sign.
Figure 8:
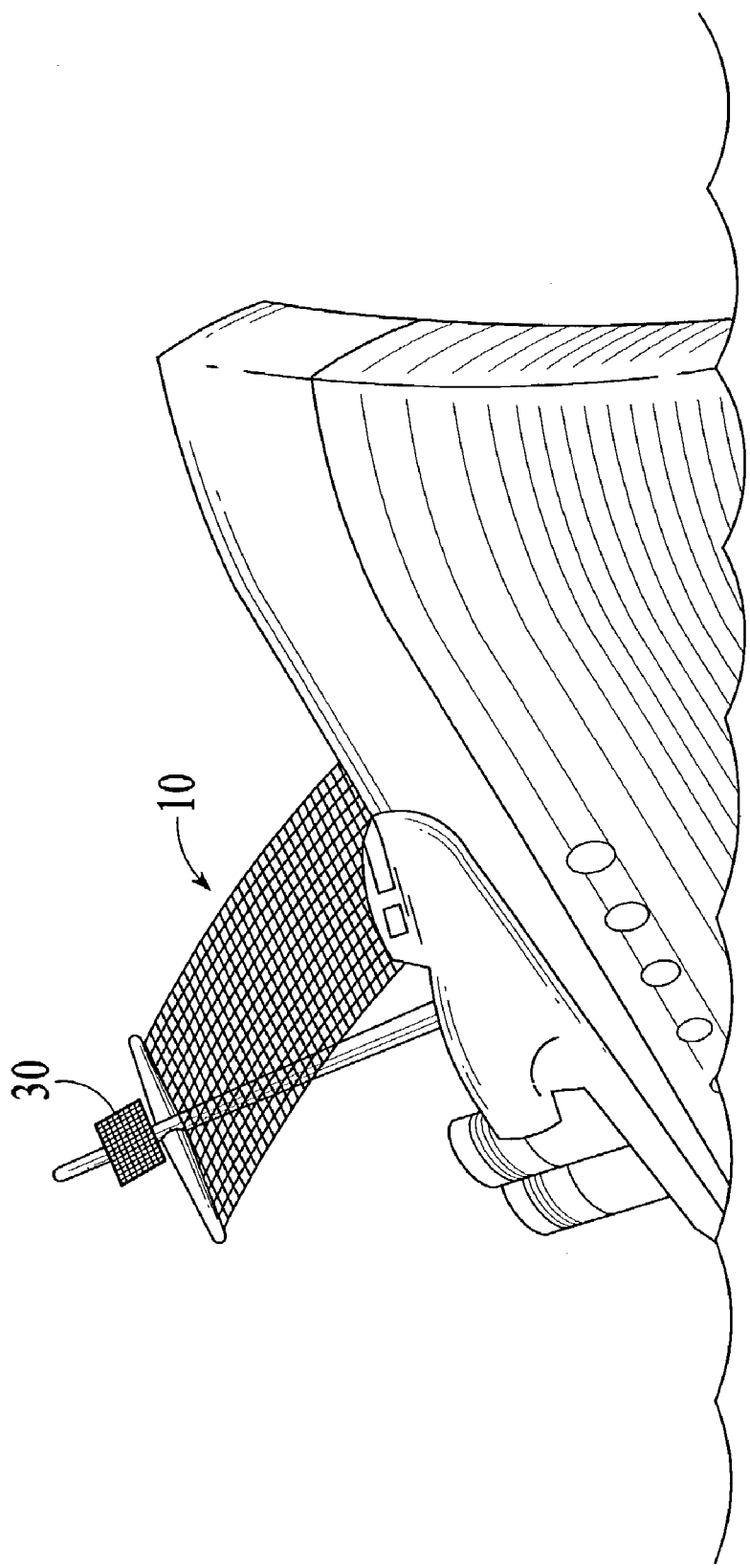
FIG. 8 shows the safety net with a solar cell used as a distress signal at sea.
Figure 9:
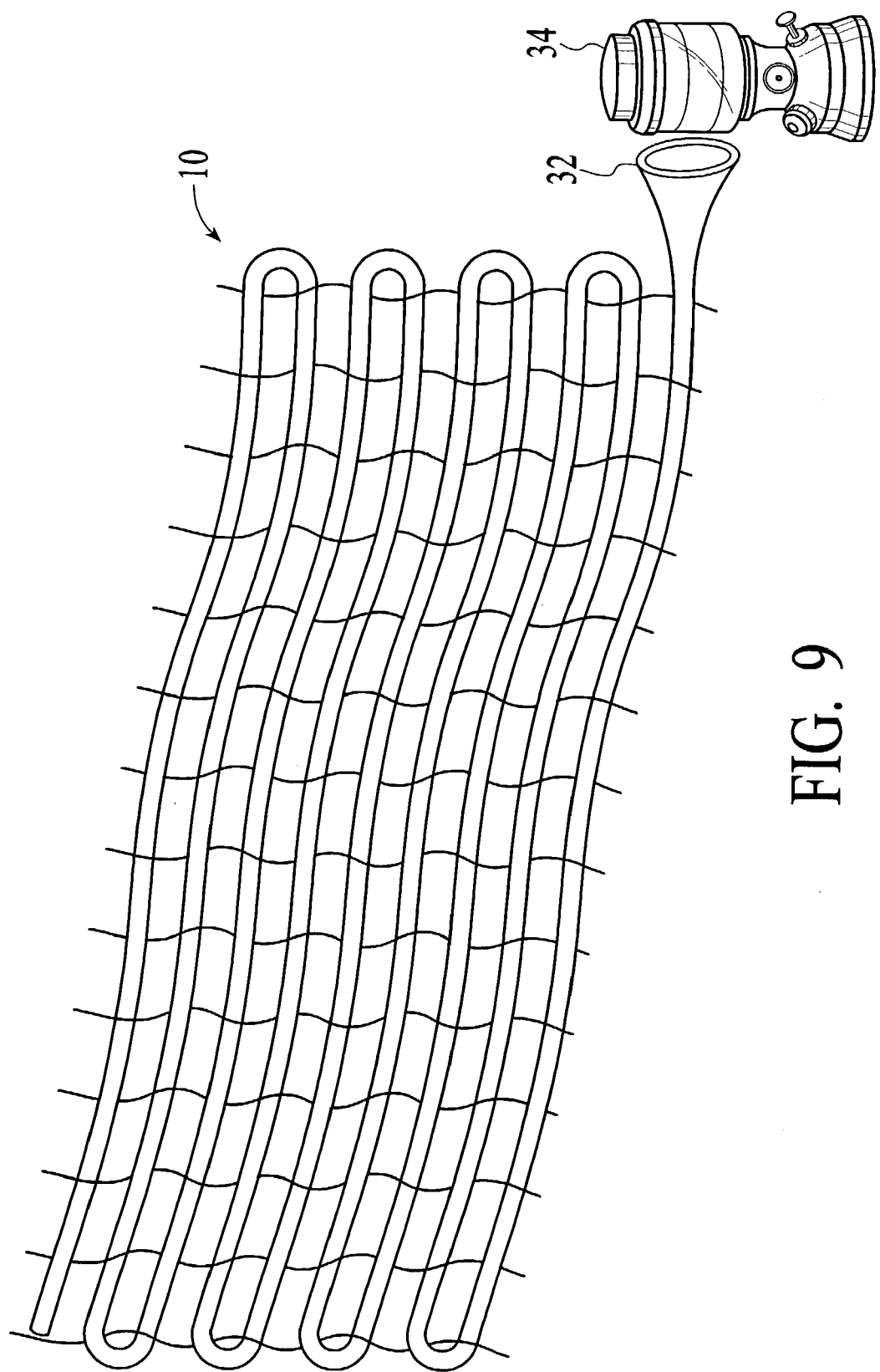
FIG. 9 shows the safety net used as a distress signal with the fiber optic components activated by a kerosene or gas lantern.

Power to illuminate the fiber optic elements 12 and 13 of the safety net 10 can most readily be supplied by using simple automotive adapters. FIG. 4 illustrates the safety net 10 powered with a standard automotive tow hitch light connector 24. FIG. 5 shows the safety net 10 powered by a dedicated fixture 26 in a car trunk. Many other power or light sources can be used with the safety net 10. FIG. 6 shows a safety net 10 powered by a battery pack 28. FIG. 7 shows a solar panel 30 driving a warning sign. FIG. 8 shows a solar panel 30 used in a maritime setting. Finally, FIG. 9 illustrates the safety net 10 powered by light gathered in a light collector 32 positioned near a gas, propane, or battery operated lantern 34, which might be best used in a wilderness setting.

Figure 10:
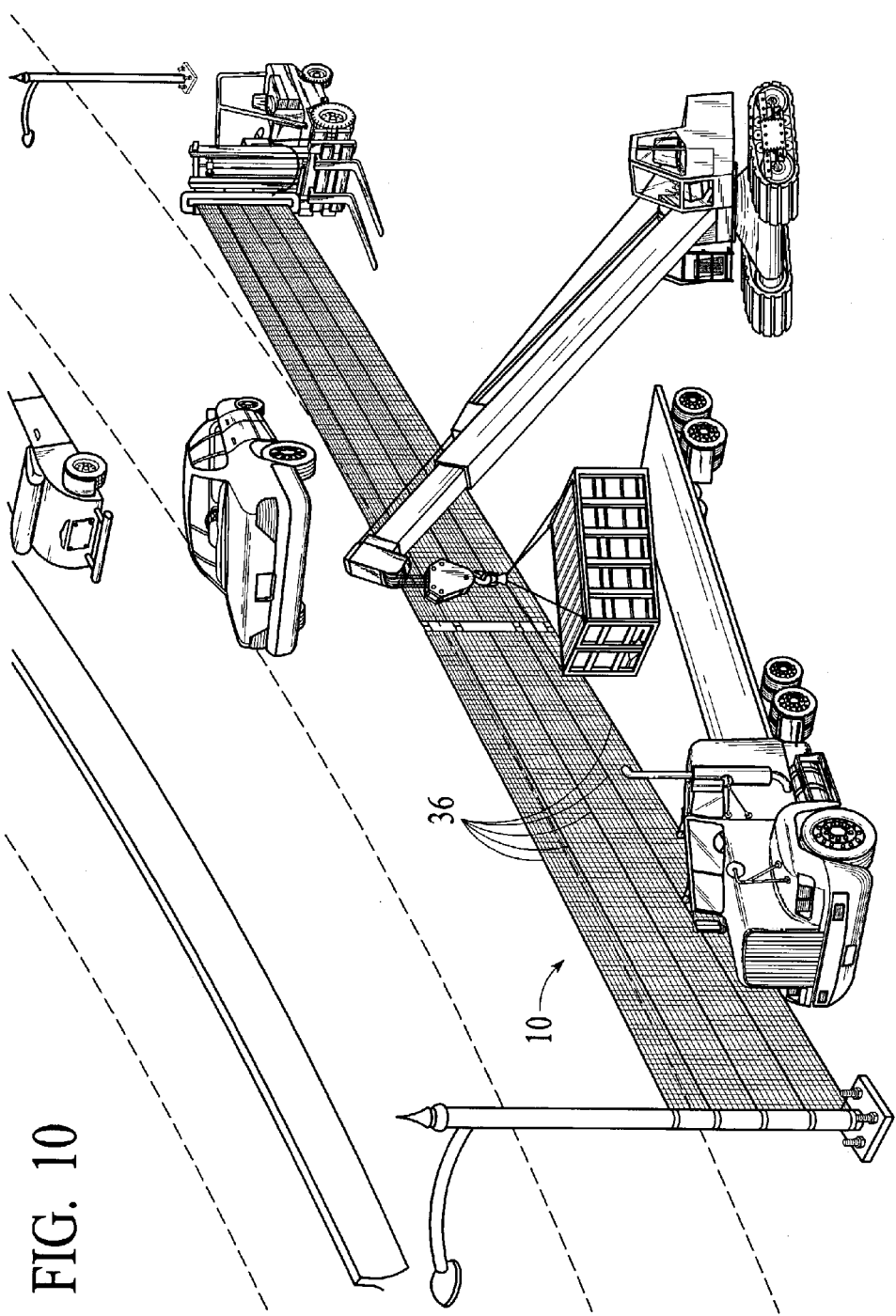
FIG. 10 shows the safety net including metal cables deployed at a construction site as both a vision screen and a physical barrier.

The safety net 10 of the present invention may also be fitted with one or more metal cables 36 for additional impact resistance. FIG. 10 shows the safety net with metal cables 36 deployed at a construction site. In a setting such as this, the safety net 10 is used as both a vision screen and a physical barrier. The metal cables 36 add another level of safety, in that a moving vehicle that does come into contact with the safety net 10 is slowed or stopped. For this aspect of the safety net 10 to be effective, both ends of the safety net 10 must of course be attached to secure objects, i.e. neither end can be supported by a free-standing post 22.

Figure 11:
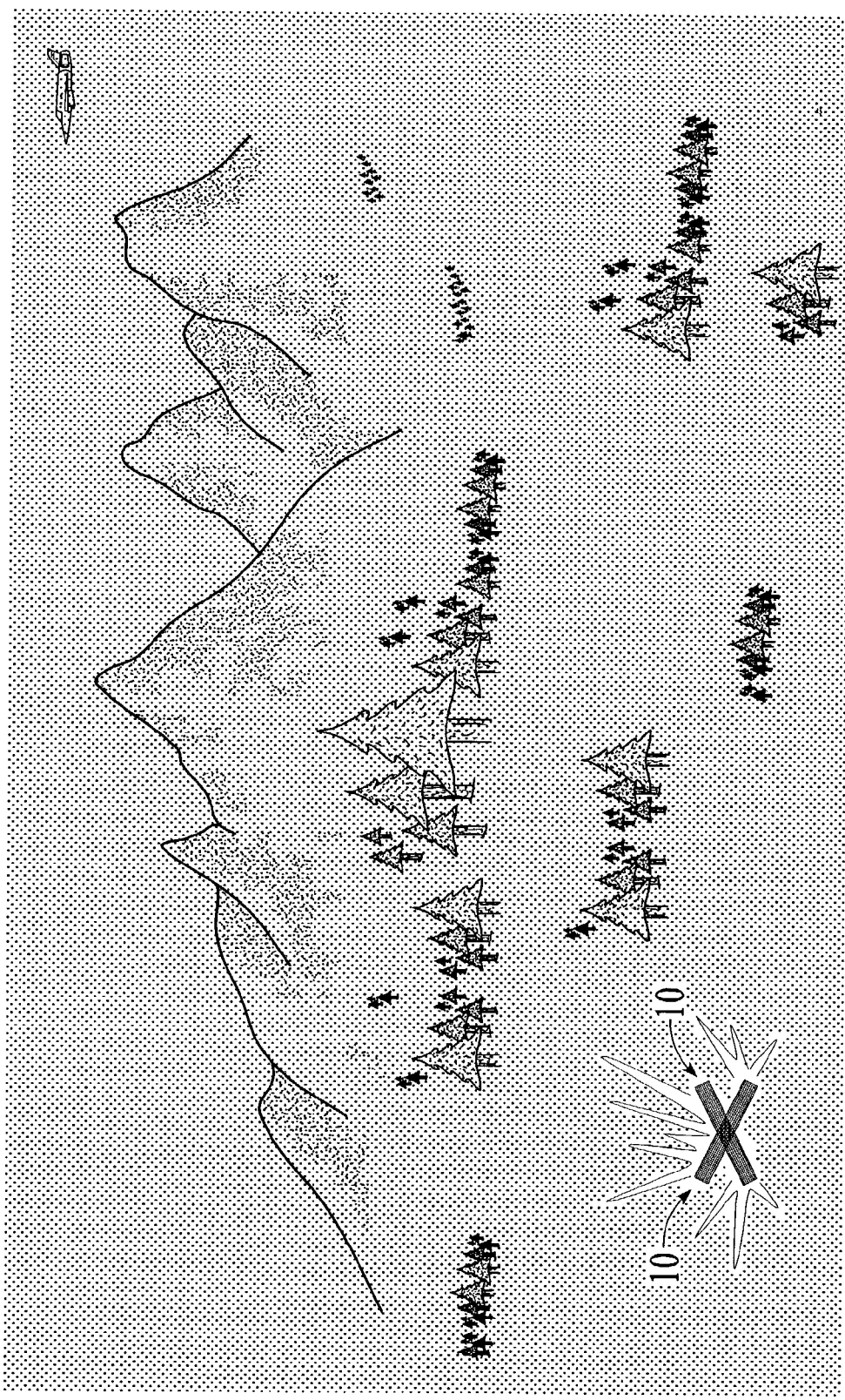
FIG. 11 shows the safety net used as a distress signal in the wilderness.
Figure 12:
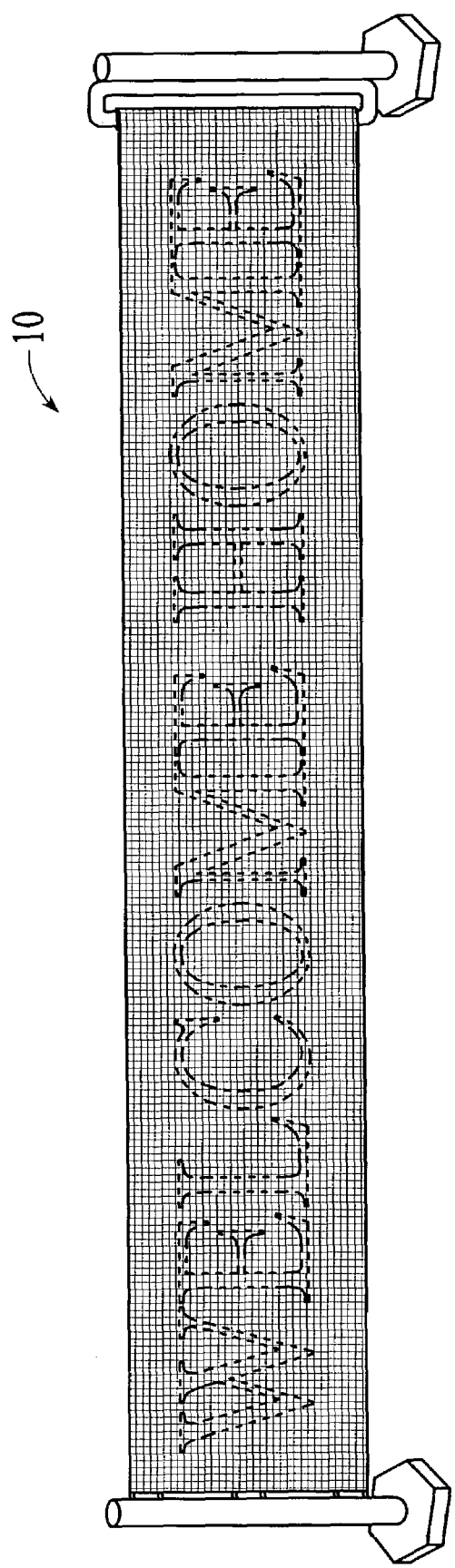
FIG. 12 illustrates a free-standing embodiment of the safety net used as a banner.
Figure 13:
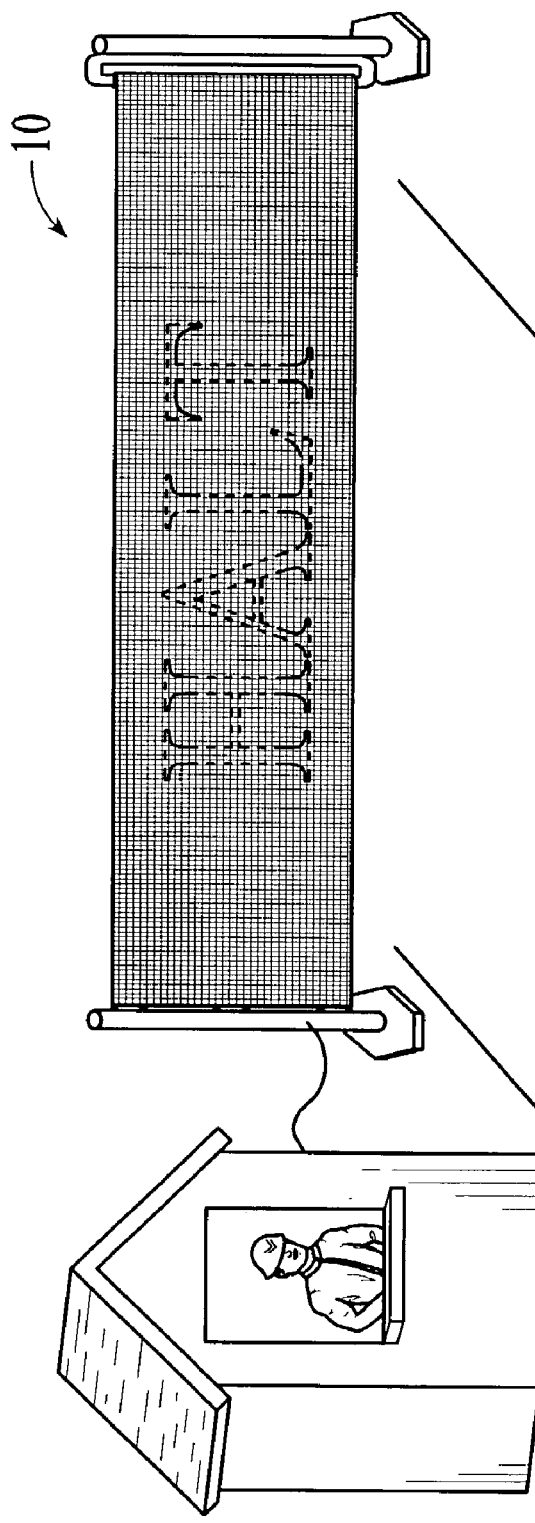
FIG. 13 shows the safety net utilized at a safety checkpoint.
Figure 14:
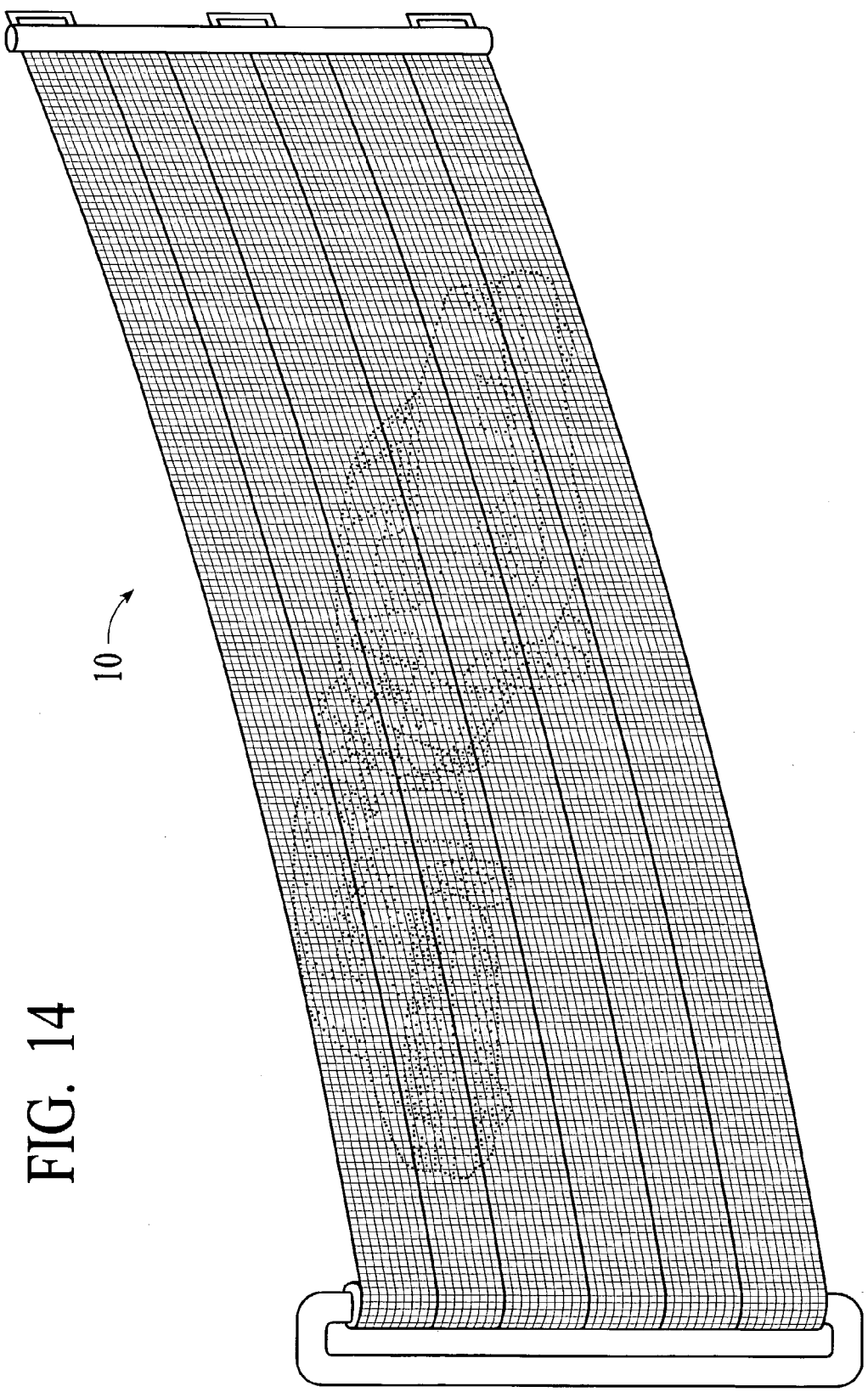
FIG. 14 illustrates the vision restricting capabilities of the present invention.

Other uses and applications of the safety net 10 are readily discernible to those skilled in the art. FIG. 11 shows another wilderness application in which a pair of safety nets 10 are used as an emergency rescue marker. The safety net 10 can be draped across the ground or hung between trees like a hammock for outdoor sleeping as well. FIG. 12 shows the safety net 10 used as a welcoming sign, while the safety net 10 shown in FIG. 13 expresses the opposite sentiment. FIG. 14 shows the safety net 10 deployed at an accident site, demonstrating the visual inhibiting features.

Figure 15:
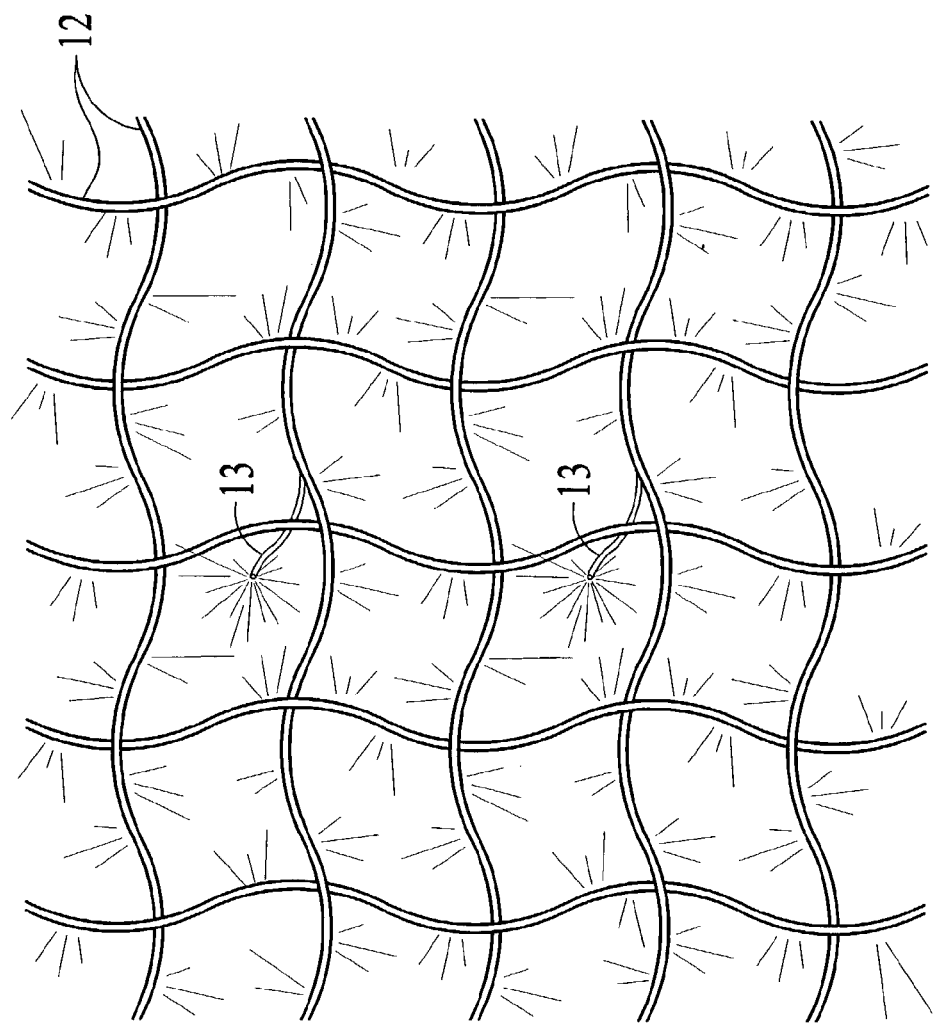
FIG. 15 shows the safety net with the fiber optic components activated to maximize visibility.
Figure 16:
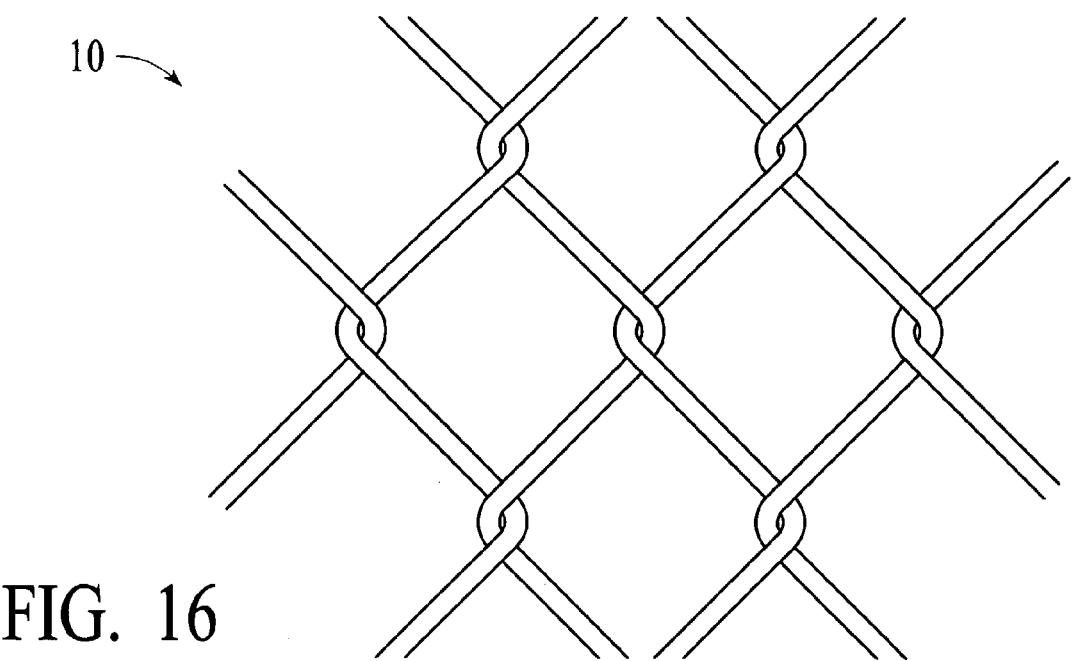
FIG. 16 shows the safety net woven from fiber optic elements joined in chain link fashion.
Figure 17:
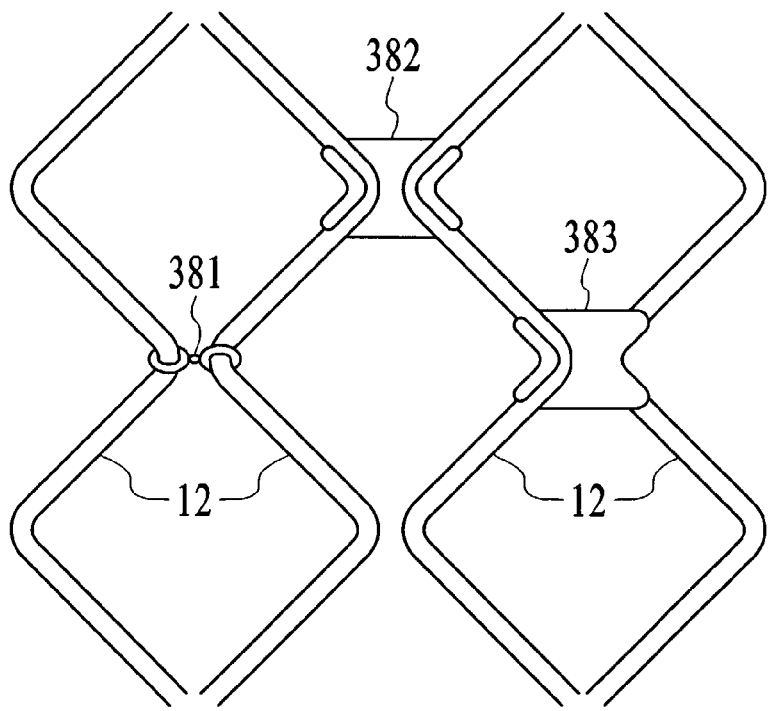
FIG. 17 shows the safety net fiber optic elements linked with various types of connectors.

FIGS. 15–17 illustrate some of the many constructions suitable for the fabric portion of the safety net 10. FIG. 15 shows a woven configuration in which the fiber optic elements are passed over one another to form a square mesh. Also shown are added fiber optic elements that channel a brighter and/or colored light. FIG. 16 shows the net 10 formed in "chain link" fashion. Finally, FIG. 17 illustrates a diamond pattern with the intersections of the fiber optic elements secured by connectors. A first connector 381 comprises a pair of circular elements secured back-to-back. The circular elements have openings to receive the fiber optic elements. A second connector 382 comprises a pair of opposing v-shaped elements on one side of a flat body. The v-shaped elements secure adjoining angled portions of the fiber optic elements. A third connector 383 also comprises a pair of opposing v-shaped elements, but one v-shaped element is on a first side of the flat body and the second v-shaped element is on a second side of the flat body. Any of the connector elements can be manufactured separately from the net, or the connectors can be molded directly into the fabric of the net.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A safety and warning device comprising:
   a woven net element,
   at least one illuminating strand, said illuminating strand increasing visibility of said net element, at least one metal cable interwoven within said woven net element, said net element in combination with said metal cable having sufficient tensile strength to restrain a motor vehicle, and mounting means on each end of said net element, at least one of said mounting means including an attachment mechanism to attach said mounting means to a motor vehicle of a user of said device; wherein said mounting means allow a user to deploy said safety and warning device in a selected area, and the entire device including mounting means is compact enough to be contained in a trunk of the motor vehicle of the user.

2. The safety and warning device of claim 1 wherein:
said device comprises a plurality of illuminating strands.

3. The safety and warning device of claim 2 wherein:
an electronic controller controls lighting of said illuminating strands so that said strands display desired patterns and messages.

4. The safety and warning device of claim 1 wherein:
said at least one illuminating strand is contained in a side illuminating fiber optic conduit.

5. The safety and warning device of claim 1 wherein:
power to light said illuminating strand is obtained from an electrical system of a vehicle.

6. The safety and warning device of claim 1 wherein:
power to light said illuminating strand is obtained from a battery pack.

7. The safety and warning device of claim 1 wherein:
power to light said illuminating strand is obtained from a solar panel.

8. The safety and warning device of claim 1 wherein:
illumination means to light said illuminating strand is obtained from an external light source.

\* \* \* \* \*